(12) United States Patent
Bauerhin et al.

(10) Patent No.: US 12,429,607 B2
(45) Date of Patent: Sep. 30, 2025

(54) METHOD FOR DETERMINING A STATE PARAMETER OF A RECEIVER AND AN APPARATUS FOR PERFORMING SUCH A METHOD

(71) Applicants: Spaceopal GmbH, Munich (DE); ANavS GmbH, Munich (DE)

(72) Inventors: Andre Bauerhin, Gilching (DE); Patrick Henkel, Seefeld (DE)

(73) Assignees: SPACEOPAL GMBH, Munich (DE); ANAVS GMBH, Munich (DE)

( * ) Notice: Subject to any disclaimer, the term of this patent is extended or adjusted under 35 U.S.C. 154(b) by 364 days.

(21) Appl. No.: 18/012,328

(22) PCT Filed: Jun. 25, 2021

(86) PCT No.: PCT/EP2021/067524
§ 371 (c)(1),
(2) Date: Dec. 22, 2022

(87) PCT Pub. No.: WO2022/002791
PCT Pub. Date: Jan. 6, 2022

(65) Prior Publication Data
US 2023/0314626 A1    Oct. 5, 2023

(30) Foreign Application Priority Data
Jun. 30, 2020   (EP) ..................... 20183243

(51) Int. Cl.
*G01S 19/44*    (2010.01)
*G01S 19/39*    (2010.01)
*G01S 19/40*    (2010.01)

(52) U.S. Cl.
CPC ............ *G01S 19/44* (2013.01); *G01S 19/393* (2019.08); *G01S 19/40* (2013.01)

(58) Field of Classification Search
CPC ........ G01S 19/44; G01S 19/393; G01S 19/40; G01S 19/43
See application file for complete search history.

(56) References Cited

U.S. PATENT DOCUMENTS 9,322,922 B2 *   4/2016   Pratt ....................... G01S 19/43
10,386,496 B2 *  8/2019   Dai ........................ G01S 19/072
(Continued)

FOREIGN PATENT DOCUMENTS

EP    2336807 A2    6/2011
EP    2281210 B1    3/2013

OTHER PUBLICATIONS

International Preliminary Report on Patentability for PCT/EP2021/067524 filed Jun. 25, 2021; Mail date Oct. 11, 2022.
(Continued)

*Primary Examiner* — Vladimir Magloire
*Assistant Examiner* — Anna K. Gosling
(74) *Attorney, Agent, or Firm* — CANTOR COLBURN LLP

(57) ABSTRACT

A method for determining a state parameter of a global navigation satellite system receiver and an apparatus, in particular its absolute position, determining being based on—a measured information including a pseudorange, a carrier phase and/or a Doppler frequency measurement, —broadcast information on the satellite orbits and clock offsets, and—high accuracy correction information of a satellite positions, clock offsets, code and/or phase biases, the method comprising: —determining a satellite position estimate and a clock offset estimate based on the broadcast information, —determining a corrected satellite position and a corrected clock offset based on the satellite position estimate and the clock offset estimate by using the high accuracy information, in particular the high accuracy cor-
(Continued)

rection information of the satellite position and the clock offset.

14 Claims, 2 Drawing Sheets

(56) References Cited

U.S. PATENT DOCUMENTS

2017/0269229 A1* 9/2017 Dai .................... G01S 19/32
2020/0041658 A1* 2/2020 Laurichesse ............ G01S 19/44

OTHER PUBLICATIONS

International Search Report for PCT/EP2021/067524 filed Jun. 25, 2021; Mail date Oct. 11, 2021.

Dennis Odijk et al.: "Single-Frequency Integer Ambiguity Resolution Enabled GPS Precise Point Positioning", Journal of Surveying Engineering, vol. 138, No. 4, Nov. 1, 2012, pp. 193-202, XP055160343, ISSN:0733-9453, cited in the International search report of Sep. 23, 2021.

Henkel Patrick: "Precise Point Positioning for Next-Generation GNSS", 2020 European Navigation Conference (ENC), German Institute of Navigation—DGON, Nov. 23, 2020, pp. 1-11; XP033878815, citedin the international preliminary report on patentability of Oct. 11, 2022.

Henkel et al, "Partial integer decorrelation: optimum trade-off between variance reduction and bias amplification" J Geod (2010) 84:51-63.

Jokinen et al, "Improving Fixed-ambiguity Precise Point Positioning (PPP) Convergence Time and Accuracy by using GLONASS" 25th International Technical Meeting of the Satellite Division of The Institute of Navigation, Sep. 17-21, 2012, 20 pages.

* cited by examiner

METHOD FOR DETERMINING A STATE PARAMETER OF A RECEIVER AND AN APPARATUS FOR PERFORMING SUCH A METHOD

TECHNICAL FIELD

The present disclosure concerns a method for determining state parameters of a Global Navigation Satellite System (GNSS) receiver, in particular for identifying its absolute position, and an apparatus for performing such a method.

BACKGROUND

GNSSs are well known. Examples for GNSSs are GPS, Galileo, GLONASS and BeiDou. They provide the functionality to determine the position of a static or mobile receiver, which can be, for example, integrated into any mobile device such as e.g. a mobile phone, a vehicle, a robot or an Unmanned Aerial Vehicle (UAV). Essential parts of a GNSS are satellites, which orbit the Earth and emit navigation signals. The navigation signals consist of a carrier signal with a ranging code and, optionally, navigation data modulated onto the carrier. The ranging signal in combination with the navigation data is used to determine the position of the receiver.

However, the signal transmission paths of the navigation signals from different satellites to the receiver propagate through different parts of the atmosphere and thus accumulate different delays, caused by be the troposphere and the ionosphere. In addition, the navigation information transmitted by the satellite, which contains the satellite's position, clock offset and signal biases, are affected by errors. As a consequence, navigation signals received by the receiver have different biases or off sets and thus degrade the accuracy of the position determination.

For the computation of corrections to these errors and eliminating them at the receiver, a network of global or regional reference stations can be used for the generation of differential GPS (DGPS) or GNSS corrections. The reference station network consists of fixed receiver stations in the proximity of the mobile receiver. These stations broadcast the difference between measured satellite pseudoranges and modelled pseudoranges based on the known station position, and the mobile receivers apply these corrections to their measured pseudorange. The correction signal is typically broadcast locally via ground-based radio transmitters of shorter range or provide via signal in space or terrestrial means for download. To overcome the limited accuracy of the pseudorange measurements, differential processing is also done using the much more precise carrier-phase observations.

This technique is known as real-time kinematic (RTK) positioning and also includes ambiguity resolution of differential carrier-phase measurements between the mobile receiver and a real or virtual reference station. The disadvantage of this system lies in the necessity to have a stationary receiver station close to the mobile receiver, thus, it is not helpful in areas without infrastructure to support a dense reference station network.

For improving the positioning accuracy without the dependency on a dense reference station network in the vicinity of the mobile receiver, the precise point positioning (PPP) method has been developed. In contrast to the DGPS or RTK, the PPP approach does not rely on the spatial error correlation of differential measurements, but instead eliminates the individual error components caused by, for example, satellite orbit or clock, biases and atmospheric delays, through precise models in the calculation of the position for the mobile receiver, i.e. high accuracy correction information. Thus, it is possible to calculate positions accurate to a decimetre or even below with dual-frequency measurements. It is essential for realizing such an accuracy to provide precise correction information, in particular precise orbit and clock correction information. Further, PPP allows a precise determination of the position of the mobile receiver even in regions without a dense reference station network. Examples for the PPP method can be found in EP 2281 210 B1 and EP 10 194428 A2.

The precision of the PPP approach is further supported by considering carrier phase measurements, which allows precise positioning, i.e. centimeter-level positioning on a global scale, in particular in such a case, in which a carrier phase ambiguity is fixed.

However, it turned out to be difficult to fix all carrier phase ambiguities to integer numbers for all satellites, if multipath and residual orbital, clock and bias errors are in the order of half a wavelength or more. As a result, the time to fix all ambiguities is calculation intensive and takes necessary time, and the convergence time for determining a precise information for the absolute position is typically quite long. Actually, such a convergence time is about half an hour for fixing the absolute (i.e. undifferenced and uncombined) carrier phase ambiguities.

BRIEF SUMMARY

Considering the state of the art, the disclosure is directed to providing state parameters of the receiver in real-time, in particular for identifying the absolute position of the receiver, preferably by reducing the convergence time without affecting a precision of determining the state parameter.

According to the present disclosure a method for determining a state parameters, in particular an estimated state parameter, of a global navigation satellite system receiver, in particular for identifying its absolute position, is provided, determining the state parameters being based on a measured information including a pseudorange, a carrier phase and/or a Doppler frequency measurement of a visible satellite and in particular a tracked frequency, a broadcast information on satellite orbits and clock offsets, and a high accuracy correction information of satellite positions, satellite clock off sets, satellite code and phase biases, the method comprising:

determining a satellite position estimate and a satellite clock offset estimate for the satellite based on the broadcast information, determining a corrected satellite position and a corrected satellite clock offset for the satellite based on the satellite position estimate and the satellite clock offset estimate by using the high accuracy information, in particular the high accuracy correction information of the satellite position and the satellite clock offsets, determining estimated state parameters by a recursive state estimator using at least one of the measured information, the corrected satellite position, the corrected satellite clock offset estimate, and the high accuracy correction information of the code and phase biases, determining a set of carrier phase measurements, the set of carrier phase measurements having a lumped sum of residual uncorrected range errors, for example concerning a residual satellite position error, a residual satellite clock offset error and/or a residual phase and/or code bias error after application of high accuracy correction information, being below a predefined threshold, splitting estimated state parameters into a first subset of fixable state parameters including phase ambiguity estimates of the determined set of carrier phase measurements and a second subset of non-fixable, but adjustable state parameters, mapping the estimated state parameters, being included in the first subset of fixable state parameters, to integer numbers, adjusting the estimated state parameters, being included in the second subset of non-fixable but adjustable state parameters, in dependency of the fixed phase ambiguities, and providing the mapped and adjusted estimated state parameters.

Contrary to the state of the art, it is provided according to the present disclosure to select a subset of carrier phase measurements and to fix the carrier phase ambiguity only for the selected subset. As a result, fixing the carrier phase ambiguity is performed not for all state parameters but only for the estimated state parameters of the first subset. It turned out that restricting fixing the carrier phase ambiguity only to the first subset of carrier phase measurements is sufficient to provide precise information about the state parameter of the satellite and therefore of the navigation satellite system, in particular in order to provide a precise absolute position information for the receiver. Simultaneously, the computational effort is reduced and as a consequence the convergence time can be reduced, without significantly losing precision of the determined state parameters. Thereby, selecting the first subset is based on ruling out those carrier phase measurements being assigned to those raw data having a comparable high error, for example for the measured information, in particular including high accuracy corrections. In other words: The lump sum represents a requirement for being assigned to the selected subset. Otherwise, the ambiguity of the carrier phase measurement is assigned to the second subset. The comparable high range error can occur for example for such satellites, that are rising or setting at a receiver and being strongly influenced by multipath error. For these estimated state parameters of the second subset, being member of the non-selected subset, a floating value is accepted for the further calculations, in particular the estimated state parameters being assigned to the second subset. The term "subset" preferably means that a number of state parameters being smaller than the number of all state parameters and being bigger than 0. Preferably, splitting divides the state parameter to the selected first subset or the second subset of the estimated state parameters.

Furthermore, the term individual phase ambiguity expresses that no linear combination of ambiguities are considered. For example, the term individual phase ambiguity excludes a widelane, ionosphere-free, a narrowlane and extra-widelane ambiguity. Furthermore, BIE-processes are excluded by the specification to the in dividual phase ambiguity. The individual phase ambiguity is preferably directly connected to a measured parameter and not to a linear combination of parameters, for example measured parameters.

In particular, it is provided that the state parameters include the mapped estimated state parameters of the first subset and the adjusted estimated state parameters of the second subset. Preferably the adjusted parameter of the second subset includes the absolute position of the receiver. The high accuracy correction information are information, which are provided for performing a PPP method, in particular in line with the disclosure of EP 2281 210 B1 and EP 10 194428 A2. Such high accuracy correction information are provided via the same satellite, which generates the signal for providing the carrier phase, the pseudorange and/or the Doppler frequency measurement. Alternatively, the high accuracy correction information are provided by broadcasting terrestrially of corresponding transmitter or by downloading them from the internet. Preferably, several state parameters and in particular several state parameters of different visible satellites are determined by the method for determining the state parameter, described above. In particular, "visible" refers to such satellites which transmit information to the receiver.

The receiver can integrated into any mobile device such as e.g. a mobile phone, a vehicle, a robot or an Unmanned Aerial Vehicle (UAV).

Preferably, a measured information including a pseudorange, a carrier phase and/or a Doppler frequency measurement of a visible satellite and in particular of a tracked frequency, a broadcast information on satellite orbits and clock offsets, and a high accuracy correction information of satellite positions, satellite clock off sets, satellite code and/or phase biases, the method comprising:

determining a satellite position estimate and a satellite clock offset estimate for the satellite based on the broadcast information, are provided to an analysis system including at least one processor unit, such as a microprocessor, and preferably a storage/memory unit. The analysis system is preferably configured to perform at least some or all steps of the method of the present disclosure. In particular, the measured information, the broadcast information and/or the high accuracy information are transmitted to the analysis system, being in particular a different apparatus or the receiver, via a satellite and/or a terrestrial transmitter.

The method preferably comprises the following six steps:

The first step includes the determination of the satellite position estimate and clock offset estimates from the broadcast information on the satellite orbits and clock off sets. This step is described in details in standard Interface Control Documents (ICDs) of each GNSS, such as GPS, Galileo, Glonass and Beidou.

The second step includes a refinement of the satellite position and clock offset estimates obtained from the broadcast data in the first step, i.e. high accuracy corrections of the satellite positions and clock offsets are applied. As the high accuracy satellite position corrections are provided in the orbital coordinate frame (with its axes pointing in radial, along-track and cross track directions), the corrections are first rotated into the Earth Centered Earth Fixed (ECEF) frame. The rotation matrix is obtained from a normalized direction vectors in radial, along-track and cross track directions, which are directly obtained from the satellite position and velocity vectors in the ECEF frame. For the satellite clock offsets, both the high ac curacy correction information and the relativistic corrections are applied.

The third step includes a recursive state estimator. The effect of this step is determining real-time estimates of the state parameters using the pseudorange, carrier phase and Doppler measurements of a current epoch. The state estimator shall also apply the corrected high accuracy satellite position and clock offset estimates and the high accuracy correction information of the code and/or phase biases to raw measurements to improve their accuracy. Preferably, the recursive state estimator also uses the estimated state parameters of a previous epoch.

The fourth step of the proposed method includes the selection of the subset of carrier phase measurements, of which the ambiguities can be fixed. The subset of phase measurements is chosen based on the range errors due to the residual satellite position, residual satellite clock offset and residual phase bias errors, i.e. a measurement is included in the subset if the lumped sum of range errors is below a predefined threshold.

The fifth step includes the mapping of the real-valued estimates of the phase ambiguities of the determined first subset to integer numbers. This mapping is done as the carrier phase ambiguities are by definition integer-valued.

The sixth step includes the adjustment of all other state parameters after the ambiguity fixing. This step leads to a significant improvement in positioning accuracy, as the number of unknown parameters is reduced by the fixing and as the positioning accuracy is then driven by the phase measurement noise instead of the pseudorange measurement noise, resulting in a significant improvement of the precision in determining the state parameters of the receiver, in particular its absolute position.

Preferably, the estimated state parameters are an absolute position and/or a velocity of the receiver, a receiver clock offset, a receiver clock drift, a tropospheric zenith delay, an ionospheric slant delay and/or a carrier phase ambiguity and/or wherein more than 10, preferably more than 20 and most preferably more than 30 GNSS satellite signals and other sensor or broadcast input data streams are used for determining the state parameters of the global navigation satellite system. The estimated state parameters shall include the absolute position and velocity of the receiver, the receiver clock offset, the receiver clock drift, the tropospheric zenith delay, the ionospheric slant delays and the carrier phase ambiguities. Some of these state parameters might eventually not need to be estimated if either some assumptions are imposed (e.g. receiver velocity does not need to be estimated for a receiver in static configuration), some parameters are eliminated by differencing (e.g. receiver clock offset is eliminated by single differences between satellites) or by linear combinations (e.g. first-order ionospheric delay can be eliminated by dual- or multi-frequency combinations).

In particular, the recursive state estimator is a Kalman filter with
  a state prediction, which uses the estimated state parameters of a previous epoch and a model describing the dynamics of state parameters, and
  a state update, which corrects the state prediction using the measured in formation.

A Kalman filter includes two alternating steps: The first one is a state prediction. It uses the state estimates from the previous epoch and predicts them with a state transition model. A covariance matrix of the state estimates is propagated accordingly using a process noise covariance matrix. The second step of the Kalman filter is the state update. The state update corrects the predicted estimated state parameters using the actual measured information. In this step, the measurement residual/innovation is scaled with a Kalman gain. The Kalman gain projects the measurement residual/innovation into state space domain, and depends also on the measurement covariance matrix. The Kalman gain scales the innovation such that the variance of the updated state estimates is minimized.

Preferably, a state update comprises
  determining normalized direction vectors pointing from satellites to the receiver using the corrected satellite positions and the estimated receiver position, and/or
  correcting the pseudorange and carrier phase measurements using the normalized direction vectors pointing from the satellites to the receiver, the corrected satellite positions and corrected clock offsets, and the high accuracy phase and code bias corrections, and/or
  determining a matrix describing a mapping between measured information and state parameters using the normalized direction vectors pointing from the satellites to the receiver, and/or
  determining measurement residuals using the corrected pseudorange and carrier phase measurements, the Doppler measurements, the matrix describing the mapping between the measurements and the estimated state parameters, and the estimated state parameters of the first and second subset, and/or
  correcting the predicted state parameters using the determined measurement residuals and the matrix describing the mapping between the measurements and state parameters, and/or
  determining the subset of carrier phase measurements, where the lumped sum of the residual satellite position, clock offset and phase bias errors is below a predefined threshold, and/or
  mapping the estimated state parameters of the first subset related to the phase ambiguities of the determined subset of carrier phase measurements to integer numbers, and/or
  adjusting the corrected predicted state parameters except of the ones related to the phase ambiguities of the determined subset of carrier phase measurements for the mapping of the phase ambiguities of the determined subset of carrier phase measurements to integer numbers.

The state update of the Kalman filter preferably includes a sequence of individual processing steps: First, normalized direction vectors pointing from the satellites to the receiver are determined using the high-accuracy corrected satellite positions and the estimated receiver position. Subsequently, the pseudorange and carrier phase measurements are corrected, i.e. the high accuracy satellite position and clock offset estimates are projected with the normalized direction vectors into radial direction and then applied to the measured information (in range-domain). Moreover, the satellite phase and code bias corrections are applied to the carrier phase and pseudorange measurements. Next, the matrix describing the mapping between the measurements and state parameters is determined. It includes the partial derivatives of the measurements with respect to the state parameters and, thereby, de pends on the normalized direction vectors pointing from the satellites to the receiver and the tropospheric mapping functions that depend itself on the satellite elevations. Subsequently, the measurement residuals/innovation are determined as the difference of the actual corrected measurements and the calculated corrected measurements. The latter ones are obtained by multiplying the mapping matrix with the vector of the predicted state parameters. In the next step, the measurement residuals/innovation is projected with the Kalman gain into state space domain and the projected residual is then applied as correction to the predicted state parameters. A full or partial integer ambiguity fixing can also be integrated into the state update: The subset of carrier phase measurements, wherein the lumped sum of the residual satellite position, clock offset and phase bias errors is below a predefined threshold, is first selected. Then, the estimated state parameters related to the phase ambiguities of the determined subset are mapped to integer numbers for providing the state parameters of the first subset and all other state parameters are adjusted accordingly to fully benefit from the integer ambiguity fixing for providing the estimated state parameters of the second subset. The adjustment is done by least-squares estimation.

Preferably, the state update is itself performed iteratively and the state parameter at any iteration is used in the subsequent iteration for the determination of the normalized direction vectors pointing from the satellites to the receiver. The state update requires a knowledge of the (linearized) mapping matrix between state parameters and measurements, which depends itself on the unknown receiver position. An iterative solution shall be used within the state update to improve the linearization and, thereby, the accuracy of the solution. More specifically, the updated position estimate of a certain iteration shall be used in the next iteration to deter mine the normalized direction vectors pointing from the satellites to the receiver.

Preferably, the state parameters are initialized in a first epoch
  by applying the corrected satellite positions and clock offsets and the high accuracy phase and code bias corrections to the pseudorange and carrier phase measurements, and
  by additionally applying model-based corrections for the tropospheric and ionospheric delays to the corrected pseudorange and carrier phase measurements, and
  by performing a least-squares estimation of the receiver position and velocity, the receiver clock offset and clock drift, and the carrier phase ambiguities or a subset of these parameters using the corrected pseudorange and carrier phase measurements and the Doppler frequency measurements.

A recursive state estimator like to the Kalman filter needs a certain initialization. Therefore, the state parameters shall be initialized in the first epoch by performing a least-squares estimation of the receiver position and velocity, the receiver clock offset and clock drift, and the carrier phase ambiguities or a subset of these parameters. The least-squares estimation shall use the pseudorange, carrier phase and Doppler measurements. However, the measurements shall be first corrected with the help of the highly accurate correction of the satellite position and clock offset estimates, the high accuracy correction information of the phase and/or code biases, and model-based corrections for the tropospheric and ionospheric delays to improve the accuracy of the initialization.

In particular, the measured information are pre-corrected for eventual cycle slips and clock jumps, and in which outliers of the measured information are determined and eliminated from the measurements before being used in the state update and/or wherein one or more plausibility checks of the measured information, the broadcast information and/or the high accuracy information is performed, wherein preferably at least a part of the measured information, the broadcast information and/or the high accuracy information is excluded and/or a warning signal is generated, when the accuracy of the measured information, the broadcast information and/or the high accuracy information drops below predefined thresholds As a result, the accuracy and convergence of the recursive state estimation can be further improved if the carrier phase measurements, pseudorange and Doppler measurements are carefully screened for eventual cycle slips, clock jumps and eventual outliers before using them in the state update of the Kalman filter.

Preferably, a reference satellite is chosen among all satellites to determine differences of measured information between the reference satellite and any other satellite, and in which the differences of measured information are used in the state update. A reference satellite might be chosen among all satellites to determine differences of the measurements between the reference satellite and any other satellite to eliminate the common receiver clock offset, receiver code and receiver phase bias. The single difference carrier phase, pseudorange and Doppler measurements can be used in the state update of the Kalman filter instead of the undifferenced measurements.

Especially, mapping of the estimated state parameters of the first subset related to the phase ambiguities of the selected subset of carrier phase measurements being fixed to integer numbers is performed sequentially using the covariance matrix of the estimated state parameters of the first subset related to the phase ambiguities. The mapping of the estimated state parameters related to the phase ambiguities of the determined subset of carrier phase measurements to integer numbers (also called integer ambiguity fixing or resolution) reduces the number of unknowns and improves the accuracy and convergence time of the positioning. There exist various integer ambiguity fixing techniques. The sequential fixing is a numerically very efficient approach and takes the correlation between the float ambiguity estimates into account. The success rate of the sequential fixing can also be determined very easily from the cumulative Gaussian distribution.

In particular, the mapping of the state parameters of the first subset related to the phase ambiguities of the determined subset of carrier phase measurements being fixed to integer numbers is performed by a numerical search and wherein the efficiency of this numerical search is enhanced by an integer decorrelation. This embodiment includes a more powerful integer ambiguity estimator than in the previous embodiment concerning the iteration. It performs a numerical search of the integer ambiguities based on a certain cost function. The cost function could be for example the sum of squared ambiguity residuals or the mean squared positioning error. The efficiency of the search is improved by applying an integer decorrelation to the float ambiguity solution before the actual search.

Preferably, the state parameters related to newly tracked satellites are determined by least-squares estimations using the measured information of the newly tracked satellites and the corrected predicted state parameters determined in the state up date. The receiver-satellite geometry is changing over time, which leads to newly tracked and lost satellites. The method can benefit from newly tracked satellites without the need to restart the whole solution. The state parameters related to newly tracked satellites (typically ionospheric slant delays and carrier phase ambiguities) are determined by least-squares estimation using the measurements of the newly tracked satellites and the updated state parameters as obtained in the update-step of the Kalman filter.

In particular, it is provided that additional corrections for the tropospheric delays and/or ionospheric delays are included in measurement vector being used in the state update and/or wherein measurements from other sensors are used for state update and these sensors could be an inertial, a wheel odometry, a barometer, a camera, a radar and/or a LiDAR sensor and/or a position information obtained by localization of the camera, radar and/or LiDAR sensor measurements in a map. The accuracy and speed of convergence of the positioning method can be substantially improved by using some additional atmospheric corrections. These corrections can be either tropospheric or ionospheric corrections or both. The measurement vector shall be extended, i.e. the atmospheric corrections shall be stacked below the actual measurements. Thereby, the corrections are exploited in the state update of the Kalman filter. The accuracy of the atmospheric corrections is taken into account in the measurement covariance matrix being extended accordingly.

GNSS signals are sensitive to the environment and affected by multipath and shadowing. This leads typically to a significant degradation in accuracy. A sensor fusion could overcome this issue. The Kalman filter provides an ideal basis for a tight coupling of GNSS measurements with other sensors, e.g. an inertial, a wheel odometry, a barometer, a camera, a radar or a LiDAR sensor.

Using the lump sum criteria and assigning parameters to the first subset or the second subset allows also to react on environmental condition at the mobile receiver, such as multipath errors or shadowing effects, by at least assigning parameters to the second subset for a short time period, the parameters being otherwise assigned to the first subset. By checking the lump-sum criteria in real time, it is advantageously possible to take into account influences on the parameter, being dominant or present only for a comparable short period of time.

Preferably, displacement corrections are applied to the estimate of the absolute receiver position of the state update, whereas the displacement corrections include Earth tides, polar motion and ocean loading corrections. The Earth is not a rigid body, i.e. the moon and sun lead to some periodic crustal deformations of the Earth of a few centimetres to decimetres. Therefore, site displacement corrections shall be applied to the position solution obtained from the recursive state estimator. The state displacement corrections shall include Earth tides, polar motion and ocean loading corrections to obtain an International Terrestrial Reference Frame (ITRF) compatible position solution. The Earth tide correction is far more higher than the polar motion and ocean loading corrections, and might be sufficient for numerous applications.

Another subject matter of the present disclosure concerns an analysis system, in particular an apparatus and/or its components, being configured to perform the method of present disclosure. All benefits and/or specification being discussed in the context of the method analogously apply for the analysis system and vice versa. In particular, it is provided that the analysis system comprises a processor, being incorporated into the receiver or in a different apparatus. It is even conceivable that the receiver, i. e. GNSS receiver, and the apparatus are located at the same circuit board or they are spaced from each other and the apparatus is no part of the receiver. This includes the integration of the method for determining the absolute position of a global navigation satellite system receiver either directly on a GNSS chip or on any other processor that is part of any apparatus or device with the demand of an accurate position solution.

Preferably, the term analysis system can also refer to a (personal) computer, a microcontroller, or an integrated circuit. Preferably, the analysis system comprises a calculation unit and a memory unit. A calculation unit can comprise hardware elements and software elements, for example a microprocessor or a field programmable gate array. A memory unit or storage device can be embodied as non-permanent main memory (e.g. random access memory) or as permanent mass storage (e.g. hard disk, USB stick, SI) card, solid state disk).

Another subject matter of the present disclosure is a computer program product comprising program code instructions for carrying out the steps of the method according to the present disclosure, when the program code instructions are loaded into a memory of a programmable device, in particular the analysis system of the present disclosure.

Wherever not already described explicitly, individual embodiments or their individual aspects and features can be combined or exchanged with one another without limiting or widening the scope of the described disclosure, whenever such a combination or exchange is meaningful and in the sense of this disclosure. Advantages which are described with respect to one embodiment of the present disclosure are, wherever applicable, also advantageous of other embodiments of the present disclosure.

DETAILED DESCRIPTION

Figure 1:
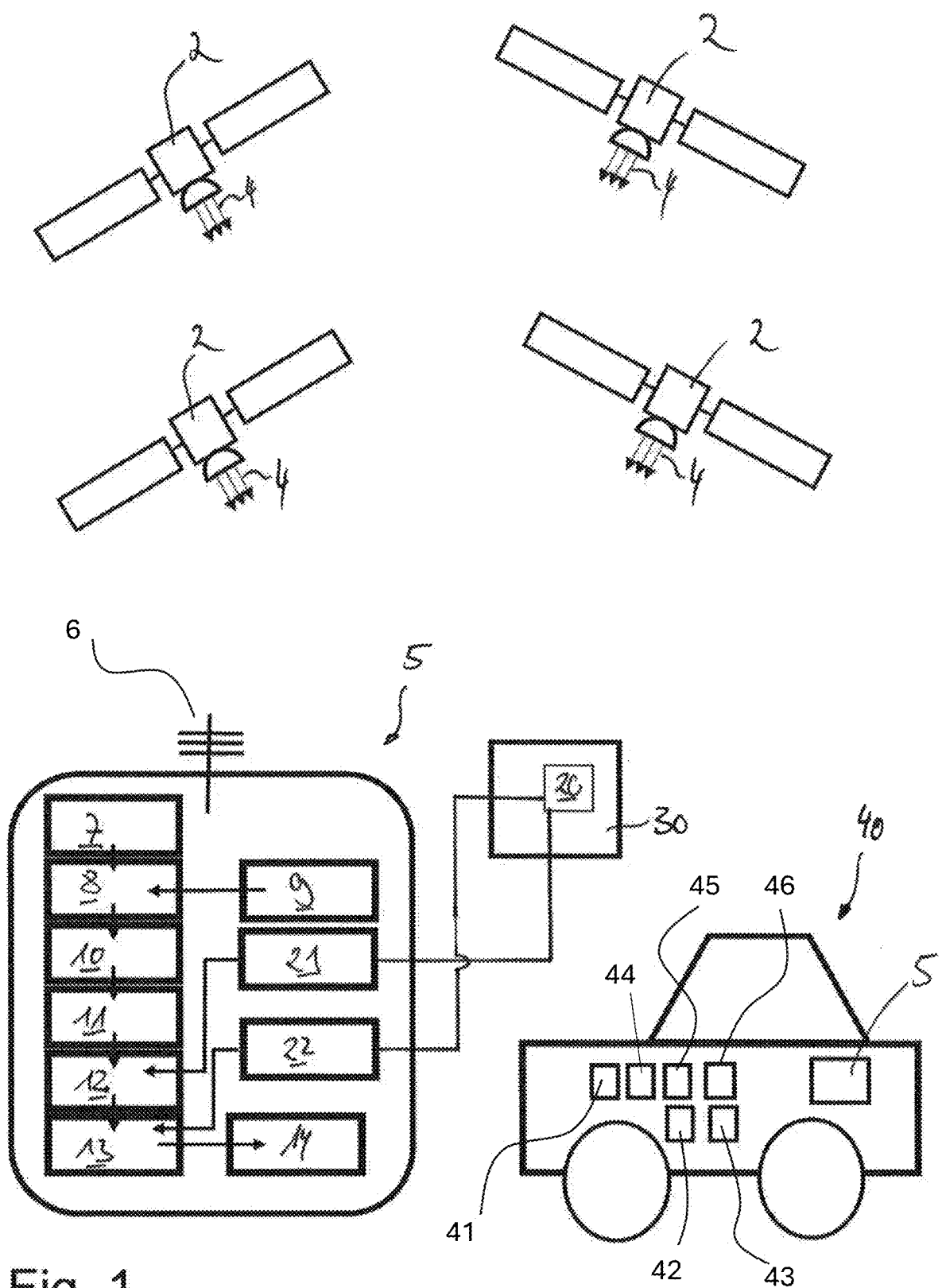
FIG. 1 schematically illustrates a first part of a method for providing a clock correction according to a first preferred embodiment of the present disclosure and FIG. 2 schematically shows flow diagram for the method for determining state parameters according to a preferred embodiment of the present disclosure

In FIG. 1 a method for determining the position of a mobile receiver 5 by using a global navigation satellite system (GNS system) is illustrated. A global navigation satellite system comprises satellites 2 orbiting around the Earth and emitting navigation signals 4 modulated on a number of carrier frequencies. The navigation signals 4 are received by a mobile receiver 5, such as a mobile navigation system that might be incorporated in a mobile unit, a robot, a vehicle and/or a UAV, via an antenna 6. The receiver 5 could also be integrated into a vehicle 40. Preferably, the vehicle includes sensors such as an inertial sensor 41, wheel sensor 42, in particular a wheel odometry sensor, a barometer 43, a camera 44, a radar 45 and/or a LiDAR sensor 46, for providing corresponding data, being considered in the method for determining the position of the receiver 5. Preferably, windows of the vehicle 40 are slanted such that they guarantee a proper working of the barometer 43. The received navigation signal 4 comprises raw data for determining the position, in particular the actual position, of the mobile receiver 5. The antenna 6 is connected to a band pass filter and low noise amplifier 7, in which the received navigation signal 4 are amplified. In a subsequent down converter 8 that is connected to the band pass filter and low noise amplifier 7 and to a reference oscillator 9, the received navigation signal 4 is converted to lower frequencies using the oscillating signal from the reference oscillator 9. The down-converted navigation signal is passing a band pass and sampling unit 10, in which the analogue navigation signal 4 is sampled. The sampled navigation signal 4 is then passed to a tracking unit 11, where the navigation signals 4, in particular phases of carrier signals and/or the delay of code signals included in the navigation signal 4, are tracked. The tracking unit 11 is followed by a bias subtraction unit 12, in which phase and/or code biases are subtracted from the phases of the carrier signals and from the pseudoranges of the code signals. A subsequent position estimation unit 13 determines the actual position of the navigation device 5 based on phase signal obtained by processing the carrier signal and the pseudorange signal based on the codes signals. The results of the position estimation can finally be displayed on a monitoring device 14.

The received GNS signal 4 is used by the mobile receiver 5 to generate pseudorange and carrier-phase measurements and decode the navigation data containing the coarse satellite position, clock offset and signal biases. In addition, the mobile receiver 5 decodes the correction data information 20 disseminated from a subset of the tracked satellites 2 on a subset of the GNS signals 4. The precise correction data is then used in combination with the coarse navigation data to precisely model the pseudorange and carrier-phase measurements and correct for atmospheric delays. The precisely modelled observations enable the mobile receiver, to compute a precise estimate of the position, in particular the actual position, using PPP. Preferably, the correction information 20, including high accuracy correction information, is provided by a central computer unit 30 and is broadcasted via satellite 2 to the receiver 5. For example, the accuracy correction information includes correction information of code and phase bias 21 and/or correction information of satellite position and clock offset 22. In particular, the correction information of code and phases bias 21 are used by the subtraction unit 12 and/or the correction information of satellite position and clock offset 22 by the position estimation unit 13.

Figure 2:
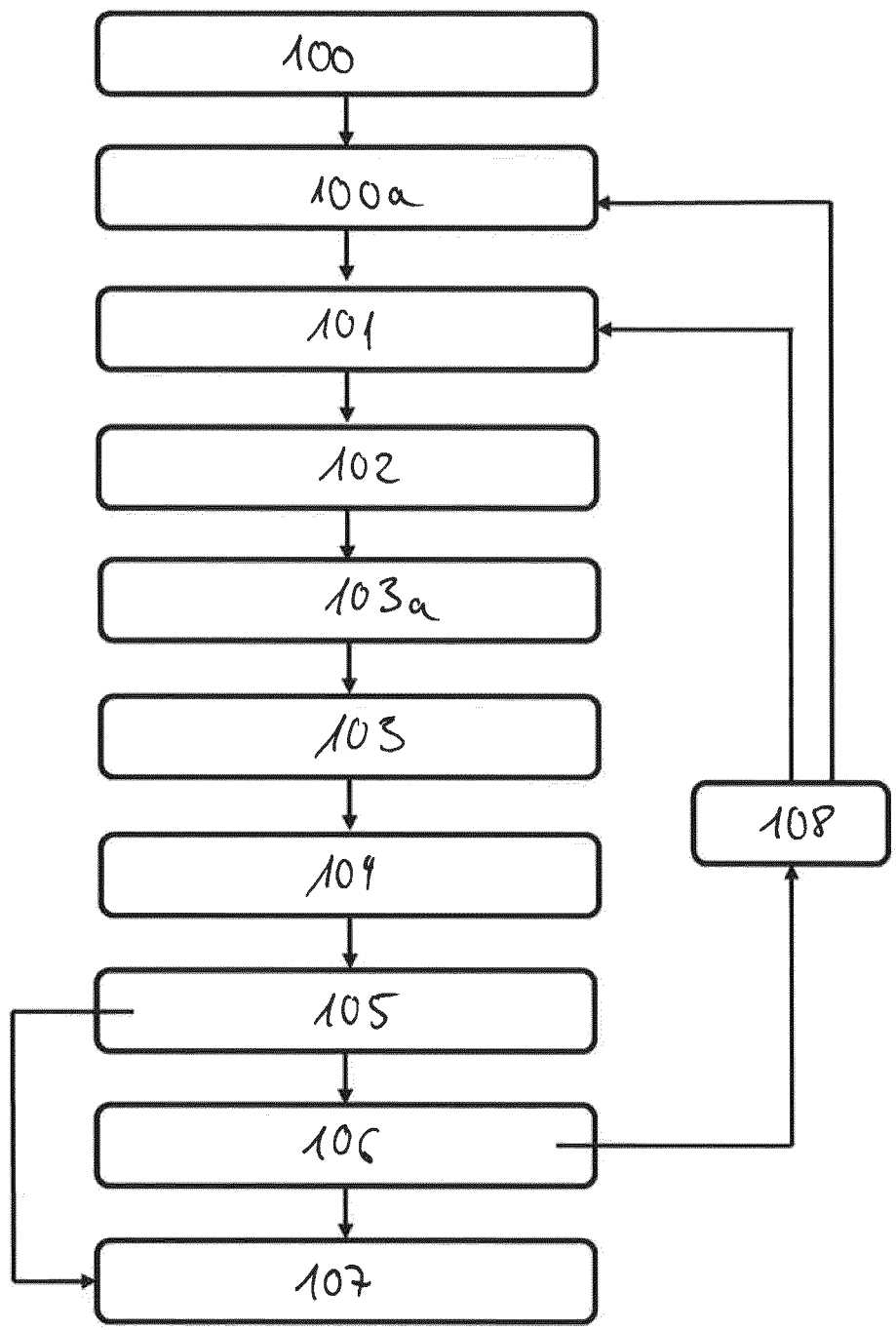

In FIG. 2 schematically a flow diagram is shown, illustrating the method of the present disclosure according to a preferred embodiment. In particular, the method is performed by an analysis system being configured to perform the step of the method. Preferably the analysis system includes at least one processor unit and a storage medium, the storage medium being configured to provide a measured in formation including a pseudorange, a carrier phase and/or a Doppler frequency measurements of a visible satellite and in particular a tracked frequency, a broad cast information on satellite orbits and clock offsets, and a high accuracy correction information of satellite positions, satellite clock offsets, satellite code and/or phase biases, the processor unit being configured to perform determining a satellite position estimate and a satellite clock offset estimate 101 for the satellite based on the broadcast information, determining a corrected satellite position and a corrected satellite clock offset 102 for the satellite based on the satellite position estimate and the satellite clock offset estimate by using the high accuracy information, in particular the high accuracy correction information of the satellite position and the satellite clock offsets, determining estimated state parameters 103 by a recursive state estimator using at least one of the measured information, the corrected satellite position and the corrected clock offset estimate, and the high accuracy information of the code and phase bias corrections, determining a set of carrier phase measurements, the set of carrier phase measurements having a lumped sum of residual uncorrected errors, for example concerning a residual satellite position, a clock offset error and/or a bias error after application of high accuracy corrections, being below a predefined threshold, splitting 104 the estimated state parameters into a first subset of fixable state parameters including phase ambiguity estimates of the determined set of carrier phase measurements and a second subset of non-fixable but adjustable state parameters, mapping 105 the estimated state parameters, being assigned to the first subset of fixable state parameters, to integer numbers, adjusting 106 the estimated state parameters, being assigned to the second subset of non-fixable but adjustable state parameters, in dependency of the fixed phase ambiguities, and providing 107 the mapped and adjusted estimated state parameters.

Preferably, it is provided that the recursive state estimator is a Kalman filter with a state prediction 100a, which uses the estimated state parameters of a previous epoch and a model describing the dynamics of state parameters to provide predicted state parameters and their covariance matrix. Furthermore, it is preferably provided that in the beginning an initialisation 100 is performed, in particular by applying the corrected satellite positions and corrected clock offsets and the high accuracy correction information of the phase and/or code bias to the pseudorange and carrier phase measurements, and/or by additionally applying model-based corrections for the tropospheric and ionospheric delays to the corrected pseudorange and corrected carrier phase measurements, and/or by performing a least-squares estimation of the receiver position and velocity, the receiver clock offset and clock drift and/or and the carrier phase ambiguities using the corrected pseudorange and carrier phase measurements and the Doppler frequency measurements.

Moreover, it is conceivable that a feedback 108 is provided, in particular to the step of determining a satellite position estimate and a clock offset estimate 101, in particular for several iterations during the state updates, and/or to the state prediction 100a for a following epoch of measurements being considered.

Preferably, a pre-correction is performed during an error screening 103a, wherein outliers of the measured information are determined and eliminated from the measured information before being used in the state update.

Thus, it is advantageously possible to reduce the number of carrier phase ambiguities to be fixed for setting the state parameters, being assigned to the satellites being available for determining the position of the receiver 5.

The invention claimed is:

1. A method for determining an estimated state parameter, in particular an estimated state parameter, of a global navigation satellite system receiver, for identifying its absolute position, determining the state parameter by an analysis system being based on a measured information including a pseudorange, a carrier phase and a Doppler frequency measurement of a visible satellite and in particular of a tracked frequency, a broadcast information on satellite orbits and clock offsets, and a high accuracy correction information of satellite positions, satellite clock offsets, satellite code and phase biases, the method comprising:

determining a satellite position estimate and a satellite clock offset estimate for the satellite based on the broadcast information, determining a corrected satellite position and a corrected satellite clock offset for the satellite based on the satellite position estimate and the satellite clock offset estimate by using the high accuracy correction information of the satellite position and the satellite clock offset, determining estimated state parameters by a recursive state estimator using the measured information, the corrected satellite position, the corrected clock offset estimate and the high accuracy correction information of the code and phase biases, wherein the estimated state parameter includes an absolute position determining a set of carrier phase measurements, the set of carrier phase measurements having a lumped sum of residual uncorrected errors, concerning a residual satellite position, a clock offset error and/or a bias error after application of high accuracy correction information, being below a predefined threshold, splitting the estimated state parameters into a first subset of fixable state parameters including undifferenced and uncombined carrier phase ambiguity estimates of the determined set of carrier phase measurements and to fix the carrier phase ambiguity only for the selected subset and a second subset of non-fixable, but adjustable state parameters, mapping the estimated state parameters, being included in the first sub set of fixable state parameters, to integer numbers, adjusting the estimated state parameters, being included in the second subset of non-fixable but adjustable state parameters, in dependency of the fixed undifferenced and uncombined carrier phase ambiguities, and providing the mapped and adjusted estimated state parameters.

2. The method according to claim 1, wherein the estimated state parameter includes a velocity of the receiver, a receiver clock offset, a receiver clock drift, a tropospheric zenith delay, an ionospheric slant delays and/or the carrier phase ambiguities, and wherein more than 10 GNSS satellite signals and other sensor or broadcast input data streams are used for determining the state parameters of the global navigation satellite system.

3. The method according to claim 1, wherein the recursive state estimator is a Kalman filter with a state prediction, which uses the estimated state parameters of a previous epoch and a model describing the dynamics of state parameters to provide predicted state parameters and their covariance matrix, and a state update, which corrects a predicted state parameters, using the measured information, and provides updated state parameters and their covariance matrix.

4. The method according to claim 3, wherein the state update comprises determining normalized direction vectors pointing from satellites to the receiver using the corrected satellite positions and the estimated state parameter, in particular its absolute position, and correcting the pseudorange and carrier phase measurements using the normalized direction vectors pointing from the satellites to the receiver, the corrected satellite positions and corrected clock offsets, and the high accuracy correction information of the phase and/or code biases, and/or determining a matrix describing a mapping between measured information and state parameters using the normalized direction vectors pointing from the satellites to the receiver, and determining measurement residuals using the corrected pseudorange and carrier phase measurements, the Doppler measurements, the matrix describing the mapping between the measurements and the estimated state parameter, and the estimated parameter of the first set and the estimated state parameter of the second subset, and/or correcting the predicted state parameters using the determined measurement residuals and the matrix describing the mapping between the measurements and state parameters, and selecting the first subset of carrier phase measurements, wherein the lumped sum of the residual satellite position, residual satellite clock offset and residual satellite phase bias errors is below a predefined threshold, and mapping the estimated state parameters of the first subset related to the phase ambiguities to integer numbers, and adjusting a state parameter, being assigned to the second subset, in dependency of the fixed phase ambiguity.

5. The method according to claim 3, according to which the state update is itself performed iteratively and wherein the state parameter at any iteration is used in the next iteration for the determination of the normalized direction vectors pointing from the satellites to the receiver.

6. The method according to claim 3, wherein the state parameters are initialized in a first epoch by applying the corrected satellite positions and corrected clock offsets and the high accuracy correction information of the phase and/or code bias to the pseudorange and carrier phase measurements, and by additionally applying model-based corrections for tropospheric and ionospheric delays to the corrected pseudorange and corrected carrier phase measurements, and by performing a least-squares estimation of a receiver position and velocity, the receiver clock offset and clock drift and/or and the carrier phase ambiguities using the corrected pseudorange and carrier phase measurements and the Doppler frequency measurements.

7. The method according to claim 3, wherein the measured information is pre-corrected for eventual cycle slips and clock jumps, and wherein outliers of the measured information are determined and eliminated from the measured information before being used in the state update and wherein one or more plausibility checks of the measured information, the broadcast information and the high accuracy information is performed, wherein at least a part of the measured information, the broadcast information and/or the high accuracy information is excluded and/or a warning signal is generated, when an accuracy of the measured information, the broadcast information and/or the high accuracy information drops below predefined thresholds.

8. The method according to claim 3, according to which a reference satellite is chosen among all satellites to determine differences of measured information between the reference satellite and any other satellite, and in which the differences of measured information are used in the state update.

9. The method according to claim 1, wherein mapping of the estimated state parameters of the first subset related to the fixed phase ambiguities of the selected subset of carrier phase measurements being fixed to integer numbers is performed sequentially using a covariance matrix of the estimated state parameters of the first subset related to the fixed phase ambiguities.

10. The method according to claim 1, wherein the mapping of the state parameters of the first subset related to the phase ambiguities of the determined subset of carrier phase measurements being fixed to integer numbers is performed by a numerical search and wherein the efficiency of this numerical search is enhanced by an integer decorrelation.

11. The method according to claim 1, wherein the state parameters related to newly tracked satellites are determined by least squares estimation using measured information of the newly tracked satellites and the corrected predicted state parameters determined in the state update.

12. The method according to claim 1, wherein additional corrections for the tropospheric delays and/or ionospheric delays is included in a measurement vector being used in the state update and wherein for state update measurements from other sensors and these sensors could be an inertial, a wheel odometry, a barometer, a camera, a radar and/or a LiDAR sensor are used.

13. The method according to claim 3, wherein displacement corrections are applied to the result of the state update, where the dis placement corrections include Earth tides, polar motion and ocean loading corrections.

14. An analysis system, comprising an apparatus, being configured to perform the method of claim 1.

* * * * *